United States Patent Office 3,652,670
Patented Mar. 28, 1972

3,652,670
SUBSTITUTED PROPARGYL BENZAMIDES
Bruce Wayne Horrom, Waukegan, and Aldo Joseph Crovetti, Lake Forest, Ill., assignors to Abbott Laboratories, North Chicago, Ill.
No Drawing. Continuation-in-part of application Ser. No. 620,651, Mar. 6, 1967. This application Dec. 5, 1968, Ser. No. 783,779
The portion of the term of the patent subsequent to Dec. 2, 1986, has been disclaimed
Int. Cl. C07c 103/30
U.S. Cl. 260—558 D
2 Claims

ABSTRACT OF THE DISCLOSURE

Substituted propargyl benzamides having the formula

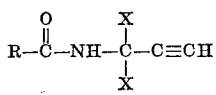

useful as biocidal agents.

DESCRIPTION OF INVENTION

This application is a continuation-in-part application of pending Ser. No. 620,651, filed Mar. 6, 1967. This invention is directed to substituted propargyl benzamides having the formula

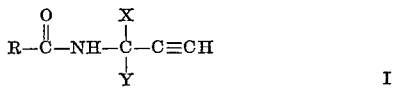

wherein X and Y each signify hydrogen and loweralkyl having 1 to 4 carbon atoms, and R represents a substituted phenyl radical. These compounds are useful as anti-bacterial, anti-protozoal and anti-fungal agents.

The activity of these compounds is believed to be dependent upon the presence of the 2-propynyl moiety as well as the particular substituted phenyl radical. The substituted phenyl radicals considered to be within the scope of this invention include:

2-chlorophenyl
3-chlorophenyl
4-chlorophenyl
2,6-dichlorophenyl
3,4-dichlorophenyl
2,4-dichlorophenyl
2,5-dichlorophenyl
3,4,5-trichlorophenyl
2-chloro-4-nitrophenyl
3,5-dinitro-4-chlorophenyl
2-methyl-3,5-dinitrophenyl
3,5-dichloro-4-fluorophenyl
2-nitro-5-chlorophenyl
2-chloro-3,5-dinitrophenyl
3,5-dinitro-4-loweralkylaminophenyl
3,5-dinitro-4-diloweralkylaminophenyl
2,4-dichloro-3,5-dinitrophenyl
3-nitro-4-chlorophenyl
2-hydroxy-3,5-dibromophenyl
3,5-dihalo-4-hydroxyphenyl
2,4,6-triiodo-3-hydroxyphenyl
2-hydroxy-3,5-diiodophenyl
2-hydroxy-5-halophenyl
3,5-dichloro-4-halophenyl The compounds of this invention are useful as anti-bacterial, anti-fungal and anti-protozoal agents, and can be employed as the active components of disinfectant compositions. These compounds effectively control a variety of microorganisms such as Chaetomium globosum, Myrothesium verrucaria, Alternaria, Rhizopus nigricans, Staphylococcus aureus, Trichomonas vaginalis, Asperigillus versicolor, Penicillium citrinum and Fusarium oxysporum. In such use, the compounds are dispersed in an inert solid, or dispersed or dissolved in a suitable solvent and applied as a dust or spray. In a typical application, the compound 2,6-dichloro-N-(1,1-dimethylpropargyl)-benzamide completely inhibits the growth of Chaetomium globosum or Myrothesium verrucaria when employed in an aqueous medium at a concentration of 1000 parts per million. In another application, the compound 2-chloro-3,5-dinitro-N-(1,1-dimethylpropargyl)-benzamide completely inhibits the growth of Staphylococcus aureus when applied in an aqueous medium at a concentration of 100 parts per million.

Generally, this series of compounds is prepared by reacting the appropriately substituted benzoic acid chloride with an appropriate propargylamine in the presence of an acid acceptor. The amine portion of the propargylamine reacts with the carbonyl group of the benzoic acid forming a bond therebetween.

Preferably, the appropriate benzoic acid chloride is added to a solution of the appropriate propargylamine and an acid acceptor, such as triethylamine, potassium carbonate, sodium bicarbonate or pyridine in a suitable inert solvent. The solvent may be any inert, organic solvent, that is, a solvent which does not react with any of the components present or the desired end product. Such solvents include benzene, tetrahydrofuran, ether, 1,2-diethoxyethane, dimethylformamide, and dimethylacetamide among others. The mixture is stirred at a temperature of from 0° to about 100° C. for at least one-half hour. Of course, if the reaction is carried out at temperatures above 50° C., the reaction rate is accordingly increased and therefore less time is needed to complete the reaction. Alternatively, the reaction may be carried out in a water solvent system containing an acid acceptor such as an alkali-metal hydroxide, sodium carbonate, or sodium bicarbonate, among others, at a temperature of from about 0° to about 35° for at least one-half hour. Upon cooling, a precipitate forms which is filtered from the solution. The filtrate is concentrated and the product crystallized from an appropriate solvent, such as methanol, ethanol, propanol, cyclohexane, chloroform, a combination thereof, or in combination with water, among others.

The following examples are presented to illustrate this invention but should not be construed as limiting the various embodiments of this invention. They are presented to illustrate the manufacture of some members of this novel series of compounds.

EXAMPLE 1

3-chloro-N-(2-propynyl)-benzamide

To a solution of 200 ml. of water and 80 ml. of 10% sodium hydroxide is added 0.1 mole propargylamine fumarate. The resulting solution is chilled and to this is added 120 ml. of 10% sodium hydroxide and a solution of 0.1 mole of 3-chlorobenzoyl chloride in 200 ml. of acetone, keeping the base in excess at all times. The reaction mixture is stirred for 3 hours until a white precipitate forms. The precipitate is filtered, washed with water and dried at 50° C. The product is crystallized from a methanol-water solution yielding 3-chloro-N-(2-propynyl)-benzamide having a melting point of 130.5°–131° C.

Analysis.—Calculated for $C_{10}H_8ClNO$ (percent): C, 62.00; H, 4.16; N, 7.23. Found (percent): C, 62.19; H, 4.33; N, 7.09.

When an equimolar proportion of N-methylpropargylamine fumarate is substituted for the propargylamine fumarate in the above reaction scheme, the 3-chloro-N-(1-methyl-2-propynyl)-benzamide is obtained in similar yields.

EXAMPLES 2–3

Using a similar procedure as in Example 1, the compounds shown in Table I, having a structure of Formula I (X and Y=H) are made from the correspondingly substituted benzoic acid chloride.

TABLE I

| Example | Compound | Percent yield | M.P. in ° C. |
|---|---|---|---|
| 2 | 4-chloro-N-(2-propynyl)-benzamide | 64.7 | 152–154 |
| 3 | 2-chloro-N-(2-propynyl)-benzamide | 43.4 | 73–75 |

EXAMPLE 4

2,6-dichloro-N-(1,1-dimethyl-2-propynyl)-benzamide

To 300 ml. benzene is added 10.4 grams (0.125 mole) of 1,1-dimethyl-2-propynylamine and 12.6 grams (0.125 mole) of triethylamine. The solution is stirred and chilled while slowly adding a solution of 26.2 grams (0.125 mole) of 2,6-dichlorobenzoyl chloride in 100 ml. of benzene. The temperature is maintained at less than 30° C. during the addition and then allowed to reach room temperature for 2 hours thereafter. A precipitate forms and is filtered from the solution and washed with fresh benzene. The solid is stirred with cool water to dissolve the triethylamine hydrochloride, filtered and dried in a vacuum oven yielding 83% of the product, 2,6-dichloro-N-(1,1-dimethyl-2-propynyl)-benzamide having a melting point of 145°–147° C.

When an equimolar proportion of 1-methyl-2-propynylamine is substituted for 1,1-dimethyl-2-propynylamine in the above procedure, 2,6-dichloro-N-(1-methyl-2-propynyl)-benzamide is formed in good yields. When 1-methyl-1-propyl-2-propynylamine is substituted in equimolar proportions for 1,1-dimethyl-2-propynylamine, 2,6-dichloro-N-(1-methyl-1-propyl-2-propynyl)-benzamide is obtained in good yields.

Following the procedure described in Example 4, several other substituted benzamides may be prepared by merely reacting an equimolar amount of the appropriately substituted benzoyl chloride with an equimolar amount of the desired propargylamine. For example, compounds such as 3,5-diiodo-4-hydroxyphenyl-(1,1-dimethyl-2-propynyl)-benzamide;
3,5-dibromo-2-hydroxyphenyl-(1,1-dimethyl-2-propynyl)-benzamide;
3-hydroxy-2,4,6-triiodophenyl-(1,1-dimethyl-2-propynyl)-benzamide;
3,5-diiodo-2-hydroxyphenyl-(1-methyl-2-propynyl)-benzamide;
5-halo-2-hydroxyphenyl-(1-methyl-1-ethyl-2-propynyl)-benzamide, as well as others may be easily prepared. Table II below gives several examples of compounds prepared according to this method, showing the particular benzoyl chloride starting material, the resulting compound, percent yield and melting point in ° C. of the product. This table refers to compounds of Formula I wherein X and Y are each —$CH_3$.

TABLE II

| Example | Starting material | Compound | Percent yield | M.P in ° C |
|---|---|---|---|---|
| 5 | 3,4-dichloro benzoyl chloride | 3,4-dichloro-N-(1,1-dimethylpropynyl)-benzamide | 72 | 106–108 |
| 6 | 2,4-dichloro benzoyl chloride | 2,4-dichloro-N-(1,1-dimethylpropynyl)-benzamide | 85 | 105–107 |
| 7 | 4-chlorobenzoyl chloride | 4-chloro-N-(1,1-dimethylpropynyl)-benzamide | 72.8 | 143–144 |
| 8 | 3-chlorobenzoyl chloride | 3-chloro-N-(1,1-dimethylpropynyl)-benzamide | 44.5 | 104–106 |
| 9 | 2-chlorobenzoyl chloride | 2-chloro-N-(1,1-dimethylpropynyl)-benzamide | 63.7 | 94–95 |
| 10 | 2-chloro-4-nitro benzoyl chloride | 2-chloro-4-nitro-N-(1,1-dimethylpropynyl)-benzamide | 67 | 114–115 |
| 11 | 3-nitro-4-chloro benzoyl chloride | 3-nitro-4-chloro-N-(1,1-dimethylpropynyl)-benzamide | 81 | 112–114 |
| 12 | 3,5-dinitro-4-chlorobenzoyl chloride | 3,5-dinitro-4-chloro-N-(1,1-dimethylpropynyl)-benzamide | 73 | 167–169 |
| 13 | 2-nitro-5-chloro benzoyl chloride | 2-nitro-5-chloro-N-(1,1-dimethylpropynyl)-benzamide | 80 | 148–150 |
| 14 | 2-chloro-3,5-dinitrobenzoyl chloride | 2-chloro-3,5-dinitro-N-(1,1-dimethylpropynyl)-benzamide | 81 | 122–125 |
| 15 | 2,4-dichloro-3,5-dinitrobenzoyl chloride | 2,4-dichloro-3,5-dinitro-N-(1,1-dimethylpropynyl)-benzamide | 70 | 182–184 |
| 16 | 3,5-dichloro-4-iodo-benzoyl chloride | 3,5-dichloro-4-iodo-N-(1,1-dimethylpropynyl)-benzamide | 66 | 175–177 |
| 17 | 2-methyl-3,5-dinitrobenzoyl chloride | 2-methyl-3,5-dinitro-N-(1,1-dimethylpropynyl)-benzamide | 73 | 134–136 |
| 18 | 3,5-dinitro-4-dimethylaminobenzoyl chloride | 3,5-dinitro-4-dimethylamino-N-(1,1-dimethylpropynyl)-benzamide |  | 199–201 |
| 19 | 3,4,5-trichloro benzoyl chloride | 3,4,5-trichloro-N-(1,1-dimethyl-2-propynyl)-benzamide |  | 154–156 |

Similarly, 3,5 - dichloro - 4 - fluoro-N-(1,1-dimethyl-2-propynyl)-benzamide may be prepared according to the procedure of Example 4 using 3,5-dichloro-4-fluoro benzoyl chloride as the starting material. This may be obtained from 3,5-dichloro-4-amino ethyl benzoate by the method of Dippy and Williams, J. Chem. Soc., 1934, 1466 to give 3,5-dichloro-4-fluoroethylbenzoate followed by reaction with thionyl chloride.

Although the procedure outlined in Example 4 can be successfully utilized to make the 3,5-dinitro-4-alkylamino-N-(1,1-dimethyl-2-propynyl)-benzamide, as illustrated by Example 18, an alternative process may be successfully employed. In this method, 3,5-dinitro-4-chloro-N-(1,1-dimethyl-2-propynyl)-benzamide is reacted with the desired alkylamine or dialkylamine in accordance with a standard chlorine replacement reaction. The chloro group in the 4-position is easily replaced by the alkylamine or dialkylamine forming the desired product. This type of reaction is illustrated in the following example.

EXAMPLE 20

3,5-dinitro-4-n-propylamino-N-(1,1-dimethyl-2-propynyl)-benzamide

A solution of 15.6 grams (0.05 mole) of 4-chloro-3,5-dinitro-N-(1,1-dimethyl-2-propynyl)-benzamide dissolved in 150 ml. absolute ethanol is stirred and warmed. To this solution is added a solution consisting of 6 grams (0.1 mole) of n-propylamine in 50 ml. ethanol. The mixture is refluxed for 10 minutes, then cooled to room temperature, and evaporated in a vacuum to yield a yellow solid. The solid is triturated with water to remove propylamine hydrochloride, and then washed with fresh water and dried in an 80° C. vacuum oven yielding 16.6 grams of 3,5-dinitro-4-n-propylamino-N-(1,1-dimethyl-2-propynyl)-benzamide having a melting point of 125°–126° C.

Where the process utilized involves a benzoyl acid chloride propylamine addition reaction, the X and Y radicals may be varied by substituting the corresponding amine in the reaction scheme. In general, an amine of the formula

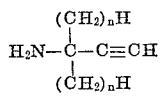

wherein each $n=0$ to 4, may be utilized in this type of reaction scheme. As can readily be seen, this series of amines contemplates the amine group being attached to the carbon atom adjacent the triple bond in the hydrocarbon chain.

Others may practice this invention in any of the numerous ways which will be suggested to one skilled in the art upon reading this disclosure. All such practice of the invention is considered to be covered hereby provided it falls within the scope of the appended claims.

We claim:
1. A compound of the formula

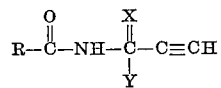

wherein X and Y are each members selected from the group consisting of hydrogen and loweralkyl having 1 to 4 carbon atoms, and R is 3,5-dichloro-4-fluorophenyl.

2. 3,5 - dichloro-4-fluoro-N-(1,1-dimethyl-2-propynyl)-benzamide.

References Cited
UNITED STATES PATENTS 3,481,979   12/1969   Horrom et al. _____ 260—558

NORMA S. MILESTONE, Primary Examiner

H. I. MONTZ, Assistant Examiner

U.S. Cl. X.R.

124—324

UNITED STATES PATENT OFFICE
CERTIFICATE OF CORRECTION

Patent No. 3,652,670          Dated March 28, 1972

Inventor(s) Bruce Wayne Horrom and Aldo Joseph Crovetti

It is certified that error appears in the above-identified patent and that said Letters Patent are hereby corrected as shown below:

Column 1 in the Abstract, please correct the formula as follows:

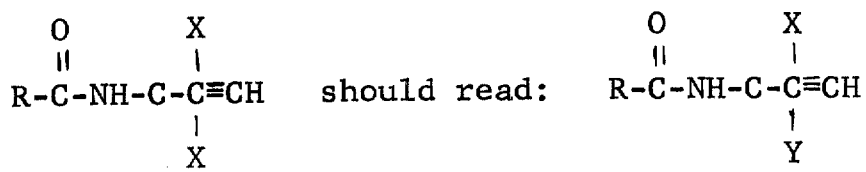

Signed and sealed this 31st day of October 1972.

(SEAL)
Attest:

EDWARD M. FLETCHER, JR.　　　　　　　　　ROBERT GOTTSCHALK
Attesting Officer　　　　　　　　　　　　Commissioner of Patents